Oct. 12, 1937.   J. SORENSEN   2,095,770
VALVE
Original Filed May 22, 1931   2 Sheets-Sheet 1
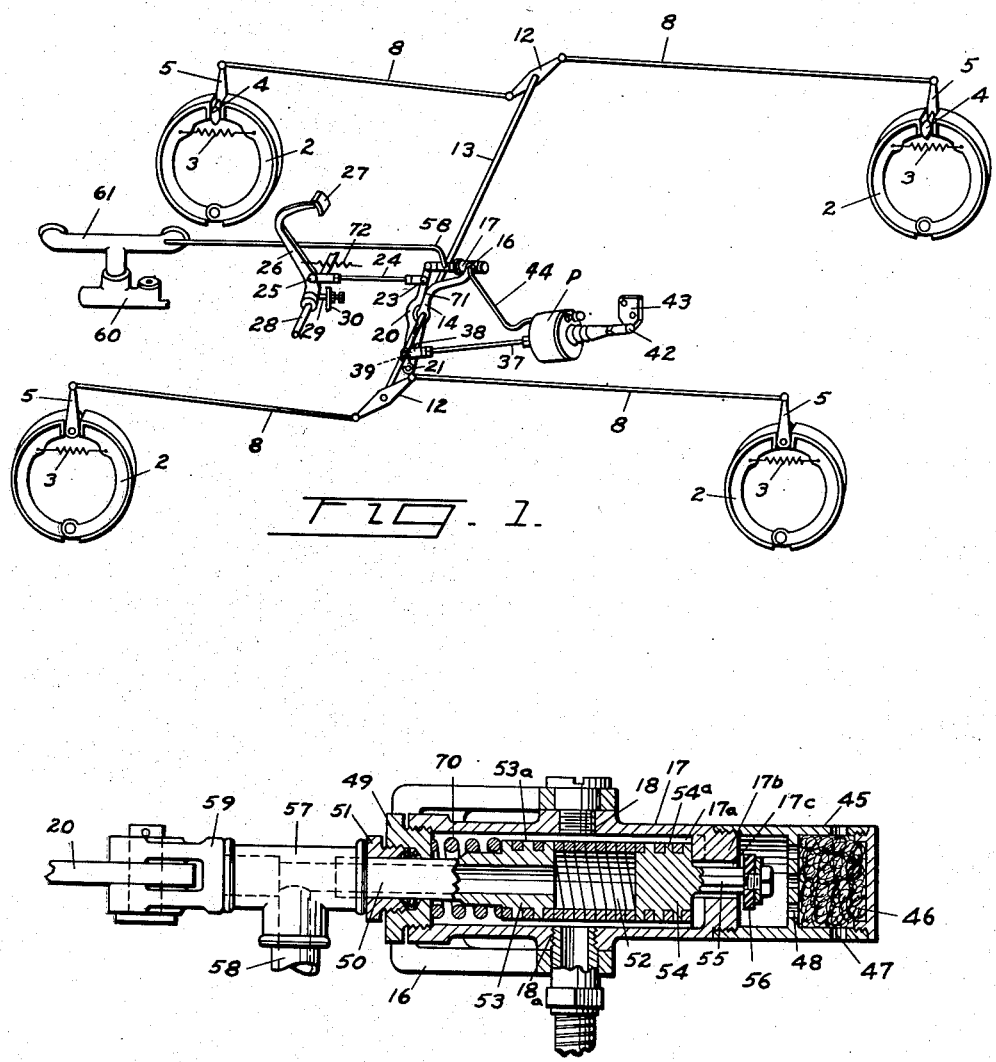
INVENTOR.
JOHN SORENSEN
BY Jerome R Cox
ATTORNEY.

Oct. 12, 1937.  J. SORENSEN  2,095,770
VALVE
Original Filed May 22, 1931   2 Sheets-Sheet 2
Fig. 3.
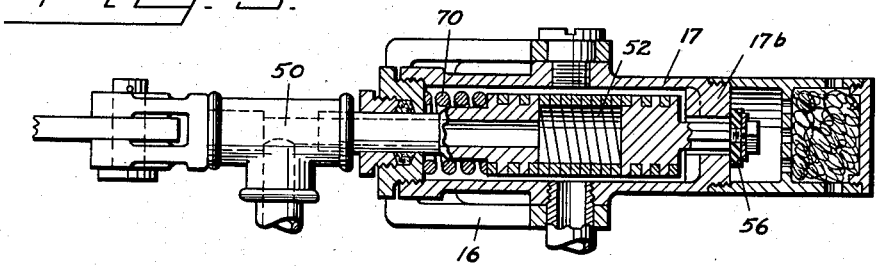
Fig. 4.
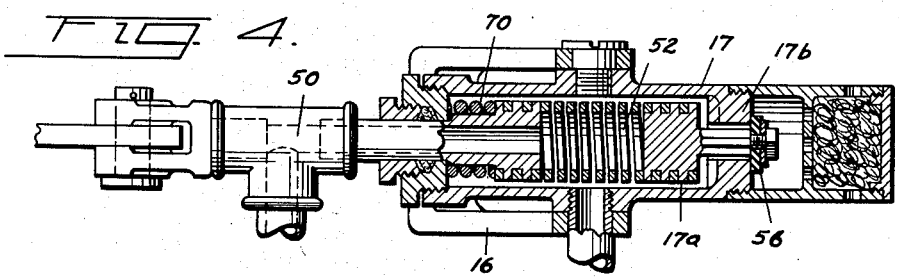
Fig. 5.
Fig. 6.
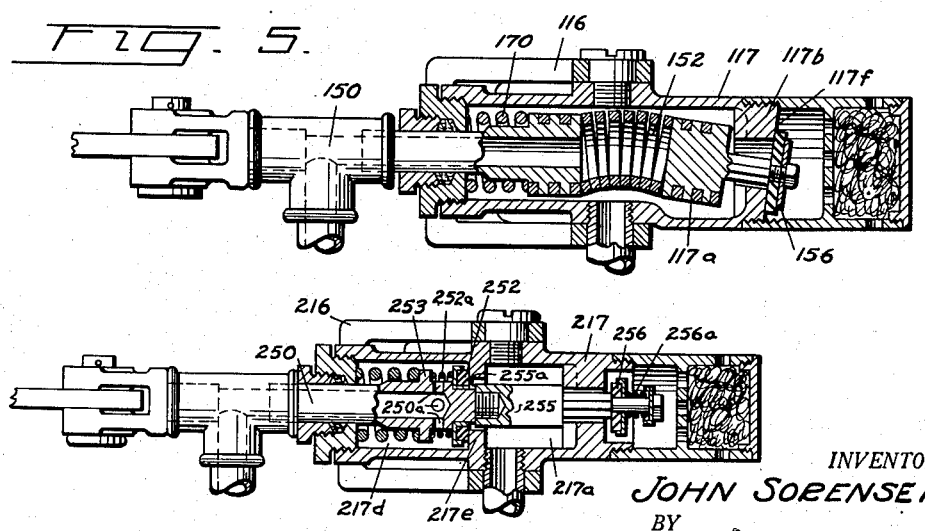
INVENTOR.
JOHN SORENSEN
BY
Jerome R. Cox
ATTORNEY.

Patented Oct. 12, 1937

2,095,770

UNITED STATES PATENT OFFICE 2,095,770

VALVE

John Sorensen, Weehawken, N. J.

Original application May 22, 1931, Serial No. 539,195. Divided and this application December 7, 1933, Serial No. 701,308

9 Claims. (Cl. 277—20)

This application is a division of my application Serial No. 539,195, now Patent No. 1,953,057, issued Mar. 27, 1934. The invention described herein is illustrated in the novel features hereinafter described, reference being had to the accompanying drawings which show one embodiment of my invention and slight modifications thereof selected by me for the purpose of illustration, and the said invention is fully disclosed in the following description and claims.

My invention comprises a special form of valve mechanism for controlling a suction connection for a fluid pressure actuator or servo motor used in a brake system, in which the brakes may be applied by power. This valve consists of a plurality of spiral coils normally held yieldingly in close contact, so as to seal said connection, but being capable of slight separation to open said connection. A very small movement of the valve operated means sufficient to effect an exceedingly minute separation of the spiral coils, will produce a spiral aperture extending between all of the support coils, and having a large area compared with the small diameter of the coils and the minute separation thereof. Satisfactory results may be had with a section of closely coiled round spring wire, but I prefer to form the coils of spring rod or wire of square or other polygonal cross section, having the coils thereof provided with plane faces, closely engaging each other, in practically air-tight contact. The resiliency of the spring coils also normally holds the said valve means in closed position.

I have shown this form of valve means for controlling the suction connection, but it will be obvious that it could likewise be employed to control the high pressure or atmospheric connection for the actuator, if found desirable. This form of valve mechanism is extremely cheap and efficient, and when it is used in the brake system described herein, is particularly advantageous, the retracting influence of its coils being applied to said levers in a direction to bring them together and to close the suction connection to hold the brakes applied.

In the drawings forming part of this application,

Figure 1 is a perspective view of a four-wheel brake system for automotive vehicles, showing my invention embodied therein, the power applying lever being secured to and pivotally supported by a rock shaft connected to several brakes by mechanical means;

Figure 2 is an enlarged horizontal sectional view partly in elevation, illustrating the control valve mechanism for the actuator shown in Figure 1;

Figure 3 is a sectional view of the valve mechanism of Figure 2, showing the positions which the various parts would occupy after the pedal has stopped its movement and after the power actuator has followed up the movement of the pedal;

Figure 4 is a view similar to Figure 3, to illustrate the position of the valve parts after the pedal has been depressed sufficiently to close the air inlet valve and open the suction valve for applying power to the brakes, but before the power actuator has moved to follow up to lap the valve;

Figure 5 is a view similar to Figure 4, showing a slightly different form of valve mechanism; and Figure 6 is a view similar to Figure 4 showing a still different form of valve mechanism.

Referring to the drawings, I have illustrated diagrammatically in Figure 1, a four-wheel brake system for automotive vehicles, in which the numerals 2 represent the brake shoes of internal expanding brake mechanism for each of the four wheels of the vehicle (not shown). The brake mechanisms may be of any usual or desired form, but in this instance are shown for purposes of illustration, as provided with retracting springs 3, expanding cams 4 and cam operating levers 5. The rock shaft 13 is an ordinary rock shaft such as is used in mechanical brakes, and in this instance is provided at its opposite ends with the usual actuating arms 12 extending in opposite directions therefrom and connected by link rods 8 with the cam actuating levers 5.

14 represents the power applying lever which is rigidly secured to the rock shaft 13, which forms a pivotal support therefor. 20 represents the physically operable lever, the lower end of which is pivotally connected to the lower end of the power applying lever 14 by a pivot pin 21. The physically operable lever extends upward past the rock shaft 13 and is provided with a pivot pin 23 for connecting one end of a draw bar or link 24 thereto. The other end of the link 24 is pivotally connected as at 25 to a pedal lever 26 provided with a pedal 27 and pivotally mounted at 28 on the chassis of the automotive vehicle in any usual or preferred manner. A suitable stop may be provided for limiting the return movement of the pedal lever, and in this instance I have shown an adjustable stop screw 29 mounted in a bracket 30 secured to the chassis for this purpose.

P represents a power actuator cylinder operated by differentials of fluid pressures. In this instance the cylinder head is rigidly connected by a rod or link 37 with physically operable lever 20, the rod 37 at its forward end being provided with a yoke 38 which passes around the power applying lever 14. The power actuator cylinder is supported in this instance, entirely by the pivot connection at the outer end of the rod 37 with the physically operable lever and the pivot connection of the piston rod with the bracket 43.

As shown in the drawings, the valve casing 17 is cylindrical in shape and is provided on opposite sides with trunnions 18 and 18a for pivotally connecting it with the yoke 16 formed on or connected with the upper end of the power applying lever 14. The trunnion 18 may be formed by a screw as shown and the trunnion 18a may be formed by a tube communicating with a chamber 17a in the valve casing and connected by a flexible pipe 44 with the closed end of the actuator cylinder p forward of the piston thereof. The valve chamber 17a is provided at one end with a wall 17b provided with an inlet aperture 17c and having an exterior threaded portion to receive a cylindrical extension 45, the interior of which communicates with the atmosphere (or other source of higher fluid pressure), in this instance through a dust strainer 46 provided with apertures 47 and 48. The opposite end of the valve chamber 17a is internally threaded to receive a closing block 49 having an aperture therein for the passage of the hollow valve stem or sleeve 50, and also provided with a stuffing box 51 or other sealing means therefor. The suction valve consists, in this instance, of a coil of spring metal indicated at 52, the coils of which are normally held in substantially air tight connection with each other by the inherent resiliency of the spring material. I have obtained very satisfactory results with spring coils of metal of circular cross section, but I prefer to use a metal wire or rod of square or other polygonal form, so that the meeting portions of the coils will be plane faces. One end of the spring coil 52 is rigidly and sealingly secured to a boss 53 surrounding the inner end of the sleeve 50 by soldering, brazing or otherwise, and the other end of the coil is similarly secured to a boss 54 having an auxiliary valve stem 55 extending through and guided in the air inlet aperture 17c and carrying at its outer end an air inlet valve which in this instance comprises a compressible disk or washer 56 on a reduced threaded extension of the stem 55 held in place by a nut and washer or in any other preferred way. The bosses 53 and 54 may be conveniently provided with threaded portions 53a and 54a to engage the end coils of the spring valve 52, which end coils may be sufficiently expanded to engage said threaded portions as shown in the drawings, but this is not essential. The auxiliary valve stem 55 is of sufficient length to hold the air inlet valve in open position in the normal position of the parts (see Figure 2) and said stem and the aperture 17c are suitably constructed to place the valve chamber 17a in communication with the atmosphere in such position. As shown, the stem is made triangular in cross section, and the aperture 17c is circular. When the air inlet valve is open, the actuator cylinder p forward of the piston will be directly connected with the atmosphere through the pipe 44 and the piston therein will be pressure balanced.

The outer portion of the hollow stem 50 is provided with a branch pipe connection 57 which is connected by a pipe 58, a portion of which is flexible, with the source of lower fluid pressure. In this instance, the pipe 58 is connected with the intake manifold 61 of the internal combustion engine 60 which is used for propelling the vehicle, the connection being made between the throttle valve and the engine cylinders in the usual manner. The outer end of the stem 50 is provided with a yoke 59 which is pivotally connected with the upper end of the physically operable lever 20 so that any separation of the levers will move the valve stem in a direction, first, to close the inlet valve and thereafter to separate the coils of the spring 52 to connect the valve chamber 17a and the actuator cylinder with the manifold or other suction sources. I provide yielding means for holding the levers 14 and 20 against separating, so that they will move simultaneously during the first operation of the pedal stroke to apply the brakes at least far enough to bring the friction surfaces of the brake mechanisms into firm engagement without operating the valve mechanism for initiating the operation of the power lever. I prefer to employ for this purpose a coil spring 70 interposed between a portion of the boss 53 on the hollow valve stem 50 and the closing block 49 of the valve casing. This spring is made somewhat stronger than the ordinary retracting springs of the brake mechanism, so that it will not begin to yield until the levers 14 and 20 have been moved by the operator far enough to apply the brake shoe (or brake band). Any other spring, for the purpose named, may be otherwise connected to the lever 20 if desired so as to prevent the separation of the levers until the friction surfaces of the brakes are in engagement.

The operation of the apparatus is as follows: The released position of the brake mechanism is illustrated in Figures 1 and 2. Assuming that the engine is running with the throttle valve closed or partly closed, a partial vacuum will exist in the intake manifold of the engine sufficient to produce a pressure differential (from atmospheric pressure) represented by approximately 20" of mercury at maximum, which will enable the actuator to operate with a maximum of fluid pressure on the piston of approximately 10 pounds per square inch. When the operator desires to apply the brakes, he will apply his foot to the pedal and depress it, thereby applying a certain amount of physical force to the upper end of the physically operable lever 20. This force will be transmitted through the valve stem 50 to coil spring 70, valve casing 17 to the upper end of the applying lever 14, thus causing both levers to turn together without separating and operating the rock shaft 13 so as to bring the friction surfaces of the several brake mechanisms into contact without operating the valve mechanism for the actuator. The movable element of the actuator, which is connected to the physically operable lever 20 adjacent to its lower end, will be moved in a direction to advance the piston in the cylinder, and as the air inlet valve 56 is still open, a certain amount of air will be expelled from the actuator cylinder so that the actuator offers no resistance to this portion of the movement of the levers 14 and 20 beyond the friction of the piston in the cylinder. As before stated, the spring 70 is strong enough to overcome the resistance of the retracting springs for the brake mechanism.

As soon as the friction surfaces of the brake mechanisms are engaged, they will offer sufficient resistance to further rotation of the rock shaft 13 to overcome the force exerted by the spring 70, so that further depression of the pedal will cause the spring 70 to yield and the physically operable lever 20 will move forward with respect to the power applying lever 14 on the pivot connecting said levers. This first closes the air inlet valve 56, as shown in Figure 3, and then separates the coils of the suction valve 52 and brings the parts into the position indicated in Figure 4.

As will be seen from an examination of Figure 4, in which the separation of the coils of the suction valve 52 is exaggerated, each of these coils will be separated from the adjacent coils. In practice, an extremely minute separation of these coils, even in a spring valve of as small a diameter as a half inch, is sufficient to place the actuator cylinder forward of the piston in full connection with the intake manifold 61. Obviously, there will exist a substantially annular passage between each coil and the next adjacent coil, and as the sum total of the area of these annular passages need only equal the cross section of the area of the aperture in the hollow valve stem 50, it is obvious that an extremely slight movement of the valve stem with respect to the valve casing is all that is required to open or close the suction valve. As soon as the suction valve is opened, the air in the actuator cylinder forward of the piston will be exhausted and atmospheric pressure acting in this instance on the forward head of the actuator cylinder will move the cylinder toward the right, as shown in Figure 1, thus applying the power of the actuator to the physically operable lever 20, and distributing this force between the brake mechanisms and the foot of the operator in a proportion depending upon the relation of the distance between the pivotal connection of the link 37 with the lever 20 and the pivot pin 21 and the distance between said pivotal connection and the pivot pin 23.

It will be seen that a suction valve in the form of a coil, as illustrated at 52, is peculiarly adapted for use in a vacuum brake system of the kind shown, as the amount of relative movement between the levers 20 and 14 required to separate the valve coils, or permit them to close, is so slight as to be microscopic and therefore the operation of the actuator in applying power to the brakes and ceasing to apply increased power will follow practically instantaneously the operation of the pedal by the foot, and the time lag which might otherwise occur when it is desired to hold the brakes as applied and which might otherwise result in the addition of a material amount of pressure during the closing movement of the suction valve is almost entirely avoided. Furthermore, the desired maximum opening to admit suction may be obtained with a coil valve of extremely small diameter and with comparatively few separable coils, so that the controlling valve mechanism can be made very small and compact and at small expense, which is distinctly advantageous.

While as a matter of fact, I have found this valve thoroughly practical at pressures far above those possible in a vacuum brake apparatus, in which the maximum differential of fluid pressures will not ordinarily exceed ten pounds per square inch, it is to be noted that the maximum vacuum which this valve has to withstand in its closed position is only obtained when the throttle valve is closed, or nearly closed, at which time the power of the engine is not required for propulsion purposes, so that even if there were a very slight leakage between the coils of the valve 52, it would not interfere with the engine, nor would it interfere with the braking operation which only takes place with the valve in open position. When the throttle valve is open for fast running and the engine is operating to propel the vehicle, there is little or no vacuum in the intake manifold and at such times, even if any air can pass the vacuum valve under such low vacuum, it would not in any way interfere with the operation of the engine. Further, when the suction valve is closed, the air inlet valve 56 is always open and pressures are balanced in the actuator cylinder so that under no circumstances could any leakage between the coils of the suction valve, even if such were to occur, have any effect on the control of the brake mechanisms. If it should be thought desirable, a simple means of obtaining substantially air tight relation of the valve coils in the closed position will be found, for example, in applying an enamel coating to the coils while in separate relation, allowing the coils to close before the coating is dry and then separating them, and holding them in separated relation while the coating dries but, as before stated, no difficulty will be experienced in forming this valve coil so that the coils will engage each other in the closed position in substantially air tight manner.

It will be understood that when the brakes have been applied with the maximum power of the actuator by still further depressing the pedal a very short distance, the operator may bring the coils of the springs 70 into engagement and apply physical force directly to the brakes through the yoke 16 and the power applying lever in addition to the power of the actuator, and in like manner can apply the brakes by physical force alone if the engine is not running or in case of failure of power. During such movement, the valve stem 50 will be moved very slightly to the left from the position indicated in Figure 4 which will be accommodated by the resilience of the air in the valve 56, or a spring may be interposed between the valve 56 and the retaining nut as shown in Figure 6. It will also be understood that when it is desired to release the brakes after an application by power, the operator will simply remove his foot from the pedal, when the valve mechanism will return to the position shown in Figure 2, the suction valve being first closed and the air inlet valve thereafter opened to admit air to the cylinder forward of the piston to equalize pressures on the actuator and permit the brakes to release themselves under the action of their retracting springs.

It is also to be understood that my invention is not limited to the particular form of controlling valve mechanism heretofore described, although it is peculiarly adapted for this purpose. Other forms of valve mechanism may be employed. In Figure 5, in which the parts corresponding to those shown in Figures 1–4 inclusive are given the same reference numerals with the addition of 100, I have illustrated a modified form of valve in which the outer end wall 117b is formed with slanting surface 117f, against which the valve 156 is adapted to seat. When the hollow valve stem 150 is moved to the left as shown in Figure 5, the seating of the valve 156 on the slanting seat 117f causes the coils of the suction valve 152 to open substantially simultaneously with the seating of the valve 156.

In Figure 6, I have illustrated a slightly modified form of valve and parts corresponding to those shown in Figures 1-4 inclusive are given the same reference numerals with the addition of 200. Therein the suction valve is of poppet type, as is also the air inlet valve. The valve illustrated in Figure 6 comprises the valve casing 217 supported by the yoke 216 in substantially the same manner as previously described. The interior of the valve casing provides the chamber 217a and a separate vacuum chamber 217d separate from the chamber 217a by a partition 217e having an opening therein which is closed by the suction valve 252 of poppet form, normally seated by spring 252a interposed between the valve and a boss 253 on the hollow valve stem 250. The valve stem is provided with lateral apertures 250a which connect the interior of the stem with the vacuum chamber 217d. The valve stem is also provided with an extension 255, carrying the air inlet valve 256 which in this instance is held against a shoulder on the stem by a light spring 256a. The extension of the valve stem is also provided with a shoulder 255a at a slight distance from the suction valve in the released position of the parts, which is adapted to engage the suction valve to open it after the inlet valve 256 has been closed.

It is to be understood that the above described embodiments of the invention are for the purpose of illustration only and various changes may be made therein without departing from the spirit and scope of the invention.

I claim:

1. A valve comprising a valve casing provided with a plurality of inlet and outlet openings and a valve element in said casing consisting of a plurality of integral spiral coils of the same diameter, capable of movement into and out of substantially fluid tight contact with each other, interposed between two of said openings, and means operative upon movement of said coil as a unit for opening or closing one of said openings and operative upon movement of said coils with respect to each other to control communication between others of said openings.

2. A valve comprising a valve casing provided with a plurality of inlet and outlet openings and a valve element in said casing consisting of a plurality of integral spiral coils of the same diameter, capable of movement into and out of substantially fluid tight contact with each other, interposed between said openings, a valve seat, a valve closure member adapted to seat on said seat and attached to one end of the coil, and means for exerting tension on the end of said coil opposite to said valve closure member to move said valve closure member towards its seat and thereafter to spread said coils with respect to each other to control communication between two of said openings, said coils being formed of resilient material and normally held by their inherent resiliency in contact with each other.

3. A valve comprising a valve casing provided with an inclosed chamber having an aperture communicating therewith, a valve element comprising a plurality of integral coils of uniform diameter capable of movement into and out of contact with each other located within said chamber and forming a hollow body closed at one end and opened at one end, a tubular member extending into said chamber and secured within the open end of the coil so as to communicate with the interior of said coil and form a continuation of the hollow body, and means including said tubular member for moving said coils into and out of contact with each other for opening and closing the valve.

4. A valve comprising a valve casing provided with an inclosed chamber having an aperture communicating therewith, a valve member comprising a hollow body formed of a plurality of integral coils of resilient material and held in substantially fluid tight contact with each other, said hollow body being closed in one end and opened in one end, means for moving said coils into and out of contact with each other comprising a longitudinal movable tubular member extending into said chamber and secured within the open end of said hollow body so as to communicate with the interior of said hollow body, and means connecting the closed end of said coil with the valve casing.

5. A valve comprising a casing having a partition with a seat having its axis inclined relative to the longitudinal axis of said casing, a coil spring in said casing normally extending longitudinally of the casing and having coils normally in contact with each other, a valve stem secured to said spring, a poppet valve secured to said valve stem and adapted to be moved into contact with said seat by said spring, and means for moving the spring to seat the valve and to bend the spring and thus open the coils of the spring.

6. A valve comprising a casing formed with a valve seat, a coil spring in said casing having coils normally in contact with each other, a valve element secured to said spring normally separated from said seat and at times brought into contact with said seat, and means to exert tension on said spring to translate the spring bodily to move the valve to its seat and to move the coils relative to each other to spread the coils.

7. A valve comprising a casing, having an inner head, a tubular member extending into said casing and formed with a shoulder, a spring secured at one end to said tubular member and forming an extension for said tubular member, and having the other end limited in its movement relative to said casing, and a spring interposed between said head and said shoulder.

8. A valve comprising a casing, a coiled spring in said casing, an element secured to and closing one end of the spring, a tube secured to and closing the opposite end of the spring except for communication between the interior of the tube and the interior of the spring and extending away from said spring, and means for moving said tube for separating the coils of said spring.

9. A valve comprising a casing, a coiled spring in said casing, an element secured to and closing one end of the spring, a tube secured to and closing the opposite end of the spring except for communication between the interior of the tube and the interior of the spring and extending in the opposite direction from said end of the spring to that of the element secured to the closed end of the spring, and means for moving said tube for separating the coils of said spring, said spring being threaded onto said element and tube.

JOHN SORENSEN.